United States Patent [19]
Kageyama et al.

[11] Patent Number: 5,960,219
[45] Date of Patent: Sep. 28, 1999

[54] DISTANCE METERING DEVICE AND AN OPTICAL APPARATUS PROVIDED WITH THE SAME

[75] Inventors: Kazumi Kageyama, Sakai; Kenji Nakamura, Kasai; Yoshito Tanaka, Sakai, all of Japan

[73] Assignee: Minolta Co., Ltd., Osaka, Japan

[21] Appl. No.: 08/997,507

[22] Filed: Dec. 23, 1997

[30] Foreign Application Priority Data

Dec. 24, 1996 [JP] Japan .................................. 8-344023

[51] Int. Cl.⁶ .................................................. G03B 13/36
[52] U.S. Cl. ............................................ 396/104; 396/123
[58] Field of Search ..................................... 396/104, 121, 396/122, 123, 125; 356/3.14, 3.13

[56] References Cited

U.S. PATENT DOCUMENTS

| | | | |
|---|---|---|---|
| 4,862,204 | 8/1989 | Ishida et al. | 396/104 |
| 5,051,767 | 9/1991 | Honma et al. | 396/80 |
| 5,805,939 | 9/1998 | Hamamura et al. | 396/123 |

FOREIGN PATENT DOCUMENTS 8-292365  11/1996  Japan.

*Primary Examiner*—W. B. Perkey
*Attorney, Agent, or Firm*—Burns, Doane, Swecker & Mathis, LLP

[57] ABSTRACT

A distance metering device includes a pair of image sensors, and a pair of optical members. Each image sensor has a number of pixels arranged along a specified direction. There is provided a distance data calculator for defining a plurality of pairs of meter areas over pixels of the first and second image sensors, and calculating distance data concerning a distance to the object by performing a plurality of comparisons between image data from a pair of meter areas by shifting the pair of meter areas relative to each other a set number of pixels. A shift pixel number for a particular pair of meter areas having a smallest spatial parallax with respect to an optical axis of an optical system of a viewfinder is made to be different from that for the other pairs of meter areas.

18 Claims, 15 Drawing Sheets

DISTANCE METERING DEVICE AND AN OPTICAL APPARATUS PROVIDED WITH THE SAME

This application is based on patent application No. 8-344023 filed in Japan, the contents of which is hereby incorporated by reference.

BACKGROUND OF THE INVENTION

This invention relates to a distance metering device which detects a distance to an object based on an object image, and further to an optical apparatus provided with a distance metering device such as camera.

In lens built-in cameras such as compact camera, a distance metering device of external light passive system is provided adjacent to a viewfinder optical system. This distance metering device includes a pair of line sensors and an objective lens for focusing an object image within a distance meter frame provided in a viewfinder on these line sensors.

The distance metering principle adopted by such distance metering device is basically according to a trigonometric metering method. Specifically, a relative displacement of an image sensed by one line sensor with respect to an image sensed by the other line sensor is detected, and an object distance is calculated using a detected displacement.

Conventionally, the distance metering device of the external light passive system adopts the following multi-spot metering method. Light receiving areas of a pair of line sensors SR, SL are each divided into, e.g., three small areas (hereinafter, distance meter areas) AR(1), AR(2), AR(3) as shown in FIG. 14. A displacement of one image (first image) with respect to the other image (second image) is detected for each of the pairs of distance meter areas AR(1) to AR(3), and an object distance is calculated using detected displacements. An object distance for auto-focusing control or AF control is calculated based on object distances of the respective pairs of distance meter areas AR(1) to AR(3).

The displacement of the first image with respect to the second image in each pair of distance meter areas is detected by comparing a first image PR(i) in the pair of distance meter areas AR(i) (i=1, 2, 3) of the line sensor SR with a second image PL(i) in the pair of distance meter areas AR(i) of the line sensor while alternately shifting these images by one pixel and deciding a shift amount where a degree of coincidence between the first and second images PR(i) and PL(i) is at maximum.

The degree of coincidence between the first and second images PR(i) and PL(i) is determined by calculating a sum F of level differences (density differences) of the pixel data in the corresponding pixel positions each time the image is shifted and by comparing the sums F for the respective shifts.

Referring to FIGS. 15 and 16, in the distance metering device of external light passive type, an optical axis L1 of a distance metering sensor 20 including the line sensors SR, SL differs from an optical axis L2 of a viewfinder optical system 21. Accordingly, a spatial parallax is created between a field of view θ1 of the distance metering sensor 20 and a field of view θ2 of the AF frame 22 provided in the viewfinder. Thus, in close-up photography, for example, pairs of distance meter areas AR(1), AR(2) of a sensing area 23 of the distance metering sensor 20 fall outside an AF frame 22, as shown in FIG. 16. If an object distance is calculated by usual multi-spot metering method, the reliability is reduced due to an error.

In order to prevent reduction in the reliability of the calculation result, it is desirable to, in close-up photography, calculate an object distance for the AF control using the pair of distance meter areas AR(3) falling within the AF frame 22.

On the other hand, in the case that only the pair of distance meter areas AR(3) falling within the AF frame 22 is used for the calculation of the object distance in close-up photography, distance metering performance can be further improved if the viewfinder optical system 21 and the distance metering sensor 20 have a fixed relative positional relationship. In other words, if the spatial parallax of the pair of distance meter areas AR(3) at least with respect to the AF frame 22 is made smaller, the measurable closest distance can be further shortened (see FIG. 15).

As a means of improving the distance metering performance in view of the above-mentioned relationship, it could be appreciated to increase the size of the respective pairs of distance meter areas AR(1) to AR(3). However, this will cause the problem that the sensing area 23 of the distance metering sensor 20 becomes larger than the AF frame 22.

SUMMARY OF THE INVENTION

It is an object of the present invention to provide a distance metering device and an optical apparatus which have overcome the problems residing in the prior art.

According to an aspect of the present invention, a distance metering device comprises a pair of first and second image sensors, and a pair of first and second optical members. The pair of first and second image sensors each include a number of pixels arranged along a specified direction. The pair of first and second optical members introduce light from an object to the first and second image sensors, respectively. They have an optical axis different from an optical axis of an optical system of a viewfinder for providing a view of the object. The distance metering device is further provided with a distance data calculator which defines a plurality of pairs of meter areas over pixels of the first and second image sensors respectively, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for a particular pair of meter areas which have a smallest spatial parallax with respect to the optical axis of the optical system of the viewfinder different from that for the other pairs of meter areas.

According to another aspect of the present invention, a distance metering device comprises a pair of first and second image sensors, and a pair of first and second optical members. The pair of first and second image sensors each include a number of pixels arranged along a specified direction. The pair of first and second optical members introduce light from an object to the first and second image sensors, respectively, the first and second optical members having an optical axis different from an optical axis of an optical system of a viewfinder for providing a view of the object. The distance metering device is further provided with a distance data calculator which defines a plurality of pairs of meter areas over pixels of the first and second image sensors respectively, the plurality of pairs of meter areas including a particular pair of meter areas for metering a close object, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for the particular pair of meter areas different from that for the other pairs of meter areas.

According to yet another aspect of the present invention, an optical apparatus comprises a viewfinder which includes an optical system having an optical axis and provides a view of an object, a pair of first and second image sensors, and a pair of first and second optical members. The pair of first and second image sensors each include a number of pixels arranged along a specified direction. The pair of first and second optical members introduce light from an object to the first and second image sensors, respectively, the first and second optical members having an optical axis different from the optical axis of the optical system of the viewfinder. The optical apparatus is further provided with a distance data calculator which defines a plurality of pairs of meter areas over pixels of the first and second image sensors respectively, the plurality of pairs of meter areas including a particular pair of meter areas for metering a close object, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for the particular pair of meter areas different from that for the other pairs of meter areas.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
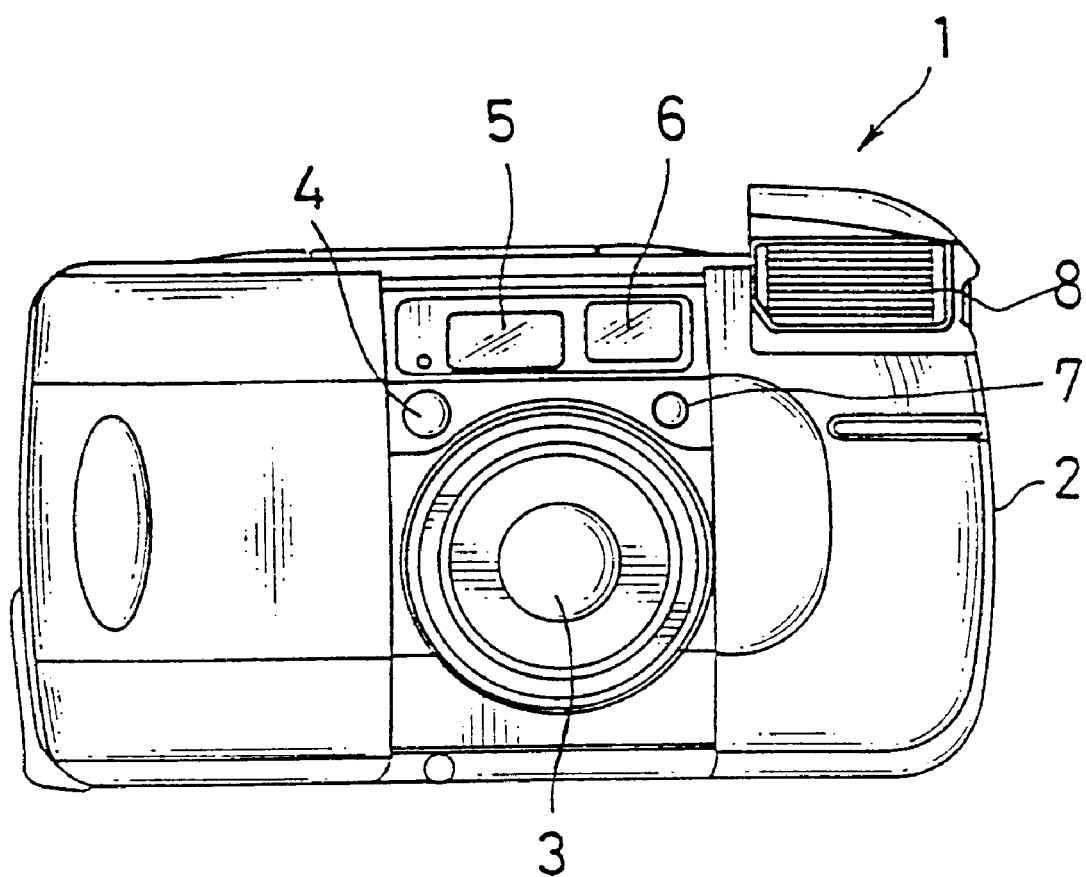
FIG. 1 is a front view of a camera provided with a distance metering device embodying the present invention.

Referring to FIG. 1, a camera 1 is provided substantially in the middle of the front surface of a camera main body 2 with a taking lens 3 including a zoom lens. A light meter 4 is provided above the taking lens 3 to the left. A lens shutter formed by combining a plurality of shutter blades is provided in a lens system of the taking lens 3. Further, a distance meter 5 is provided above the taking lens 3, and an objective window 6 of a viewfinder is provided at the right side of the distance meter 5. An auxiliary light emission window 7 for the distance metering is provided below the objective window 6. A built-in flash 8 of pop-up type is provided at a right upper end of the camera main body 2.

The light meter 4 is provided with light receiving elements such as SPCs and calculates brightness data of an object by receiving light reflected by the object.

Figure 2:
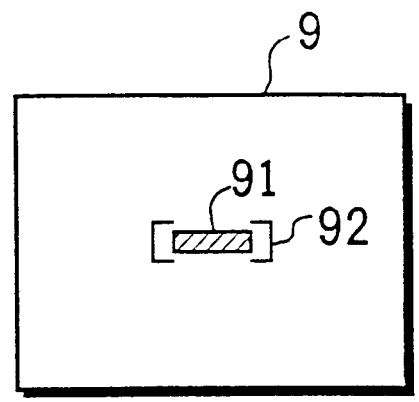
FIG. 2 is a diagram showing a sensing area of an AF sensor within a view to be photographed.

The distance meter 5 is provided with an AF sensor 10 having a sensing area 91 substantially in the middle of a view frame 9 of the viewfinder as shown in FIG. 2, and detects a distance D (m) from the camera 1 to the object (hereinafter, object distance) using image information obtained by receiving light reflected by the object fallen within the sensing area 91. In the viewfinder is shown an AF frame 92 indicative of a pair of distance meter areas in the middle of the view frame 9. A photographer performs framing so that the object he wants to focus falls within the AF frame 92, and performs focusing for this object by partly pressing a shutter release button.

Figure 3:
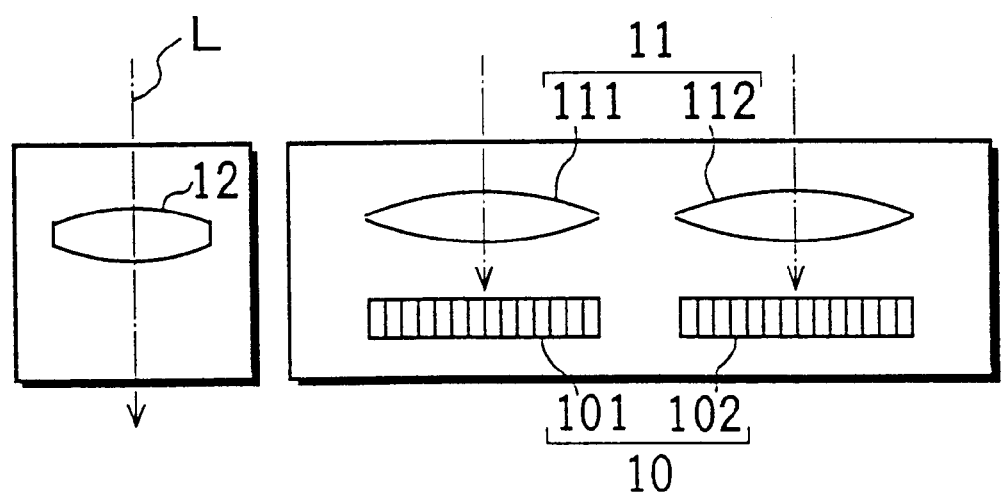
FIG. 3 is a diagram showing a construction of the distance metering device.

The distance meter 5 is, as shown in FIG. 3, mainly provided with the AF sensor 10 including a pair of line image sensors 101, 102, and a lens system 11 including a pair of fine lens arrays 111, 112 arranged in front of the line image sensors 101, 102, respectively. The line image sensors 101, 102 are spaced apart by a specified distance on the same line. The line image sensor 101 (102) is, for example, a CCD line sensor in which a multitude of charge coupled devices (hereinafter, "pixels") are aligned in a row. The distance meter 5 senses an image of a part of the object by the respective line image sensors 101, 102 and detects the object distance D using data forming the sensed images (data outputted from the respective pixels and hereinafter referred to as "pixel data").

The line image sensor 101 closer to the optical axis L of the viewfinder optical system 12 acts as a first sensing portion, and the line image sensor 102 more distanced from the optical axis L acts as a second sensing portion. A line image obtained in the first sensing portion and that obtained in the second sensing portion are compared, and the object distance D is calculated from a relative displacement of these two line images.

The auxiliary light emission window 7 is a window through which an auxiliary light for measurement of the object distance D is emitted toward the object under the condition of a low brightness. Inside the window 7 are arranged a light emitting element including a near infrared LED or the like and a lens for gathering light from this light emitting element and projecting it on the object.

Figure 4:
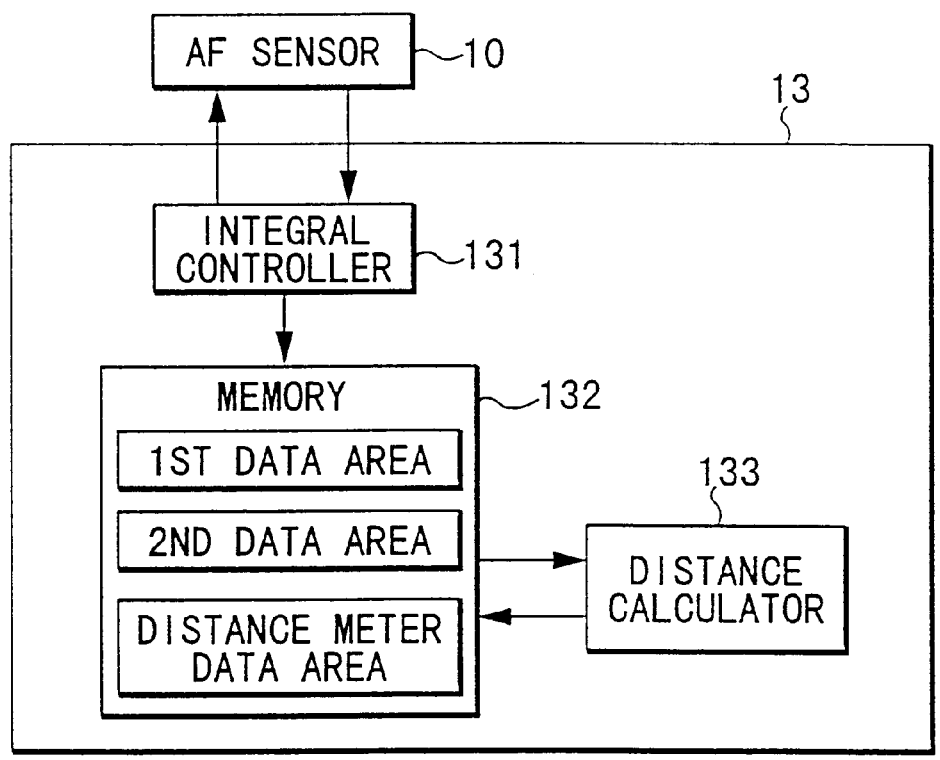
FIG. 4 is a block diagram showing a construction of a control system of the distance metering device.

Referring to FIG. 4, a main controller 13 includes a microcomputer for centrally controlling a series of photographing operations of the camera 1 including AF (auto-focusing), AE (automatic exposure adjustment) and a shutter release as well as the distance metering. The main controller 13 is provided with a processor for the distance metering control including an integral controller 131, a memory 132 and a distance calculator 133.

The integral controller 131 controls the driving of the respective line image sensors 101, 102 of the AF sensor 10 (light receiving time or electric charge storing time) and the reading of pixel data. The memory 132 is adapted to store pixel data read from the line image sensors 101, 102. The memory 132 has first and second data areas and a distance meter data area. In the first data area is stored pixel data constituting the line image sensed by the line image sensor 101. In the second data area is stored pixel data constituting the line image sensed by the line image sensor 102. In the distance meter data area is stored data concerning the object distance (hereinafter, "distance meter data") calculated by the distance calculator 133 using the line images obtained in the first and second sensing portions.

Figure 5:
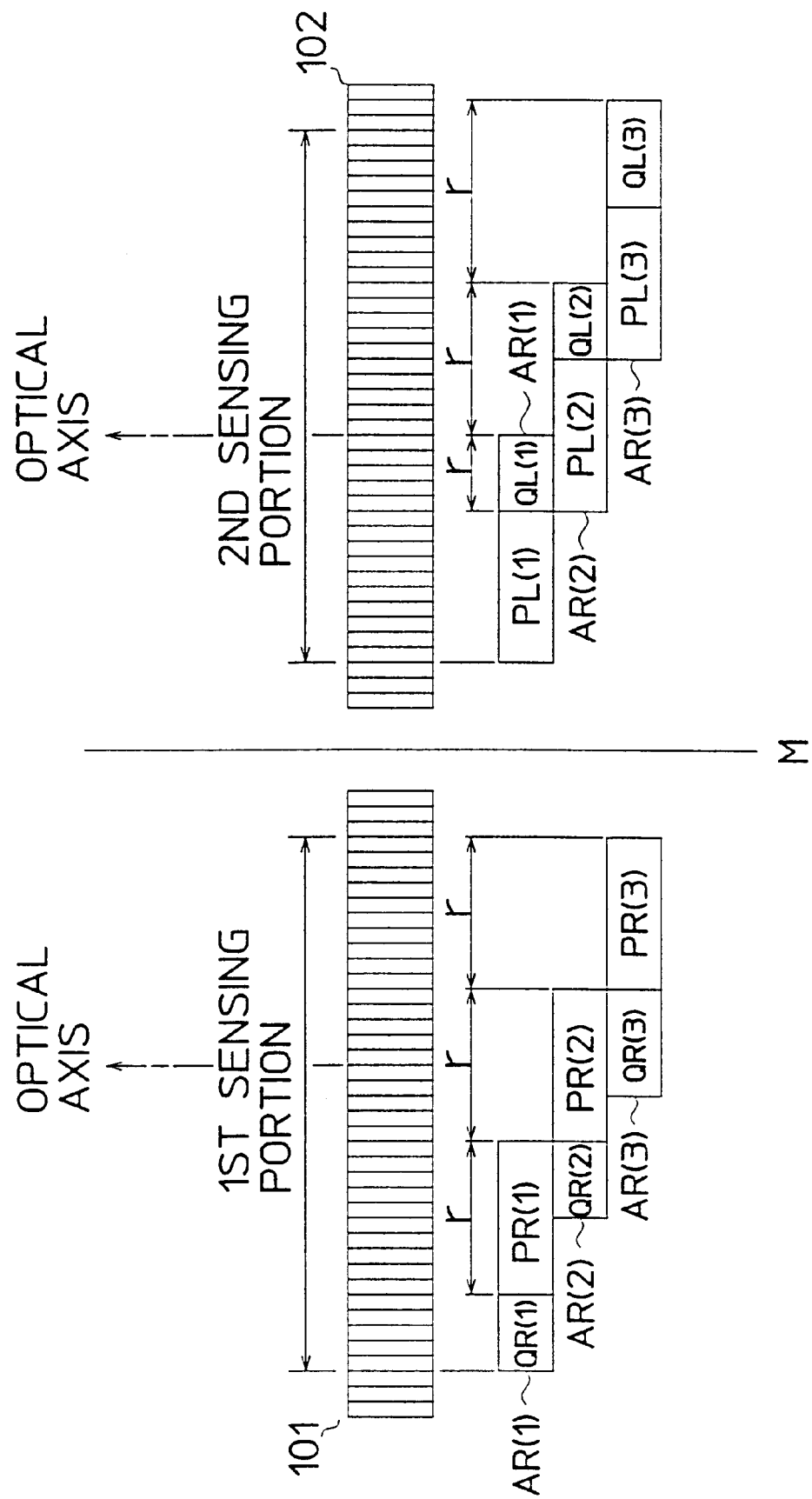
FIG. 5 is a diagram showing an arrangement of a plurality of distance meter areas provided in first and second image sensing portions of the AF sensor.
Figure 6:
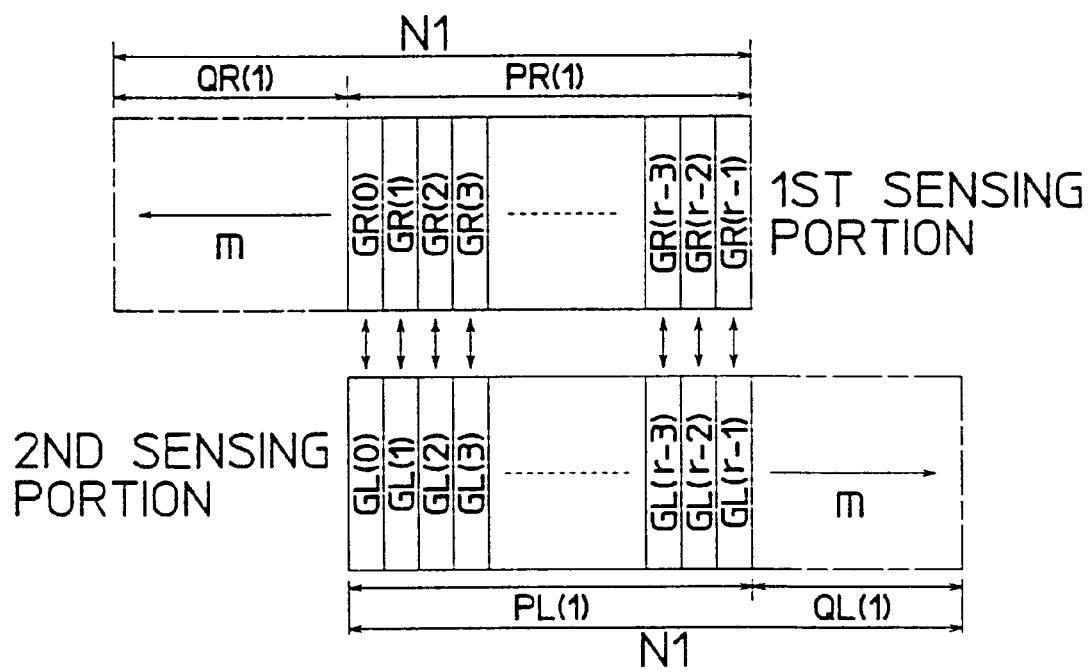
FIG. 6 is a diagram showing initial positions of calculation areas provided in the first and second image sensing portions and shifting directions of the calculation areas in correlational value calculation.

As shown in FIG. 5, the respective sensing areas of the first and second sensing portions are each divided into three pairs of distance meter areas AR(1) to AR(3). The distance meter data is calculated for each pair of distance meter areas, and the calculation results are stored in the distance meter data area of the memory 132 so as to correspond to the respective pairs of distance meter areas AR(1) to AR(3). It should be noted that FIG. 5 shows an arrangement of a plurality of distance meter areas provided in the sensing areas of the first and second sensing portions. The number of distance meter area pairs is not limited to three as this embodiment, but may be two, or four or more.

The distance meter data in each pair of distance meter areas AR(i) (i=1, 2, 3) is calculated as follows. A first pixel data group (hereinafter, "first image") comprised of a part of neighboring pixel data within the distance meter area AR(i) of the first sensing portion and a second pixel data group (hereinafter, "second image") comprised of the same number of neighboring pixel data within the distance meter area AR(i) of the second sensing portion as the first pixel data group are compared while being alternately shifted along column and row directions. Then, a correlational value F indicative of a degree of coincidence between the two images is calculated.

For example, in the case of the pair of distance meter areas AR(1), this correlational value F is calculated as follows, assuming that N1, r(<N1) and NS(<N1) denote a total pixel number included in the pair of distance meter areas AR(1), the number of pixels constituting the images for the calculation and the number of times the images are shifted for the calculation, respectively. If N1=(NS/2+r), a calculation area PR(1) including the first image is set at a right end portion of the distance meter area AR(1) of the first sensing portion (accordingly, a shift area QR(1) is set at the left end side) and a calculation area PR(2) including the second image is set at a left end portion of the distance meter area AR(1) of the second sensing portion (accordingly, a shift area QL(1) is set at the right end side). First, before the first and second images are shifted (shift number=0), level differences $\Delta D(i)$ between pixel data GR(i) and GL(i) in corresponding pixel positions i (i=0, 1, . . . , r−1) of the first and second images are calculated, and a sum of these level differences $\Delta D(i)$ are calculated as a correction value F(0) when the shift number=0. It should be noted that F(K) is a correlational value when the shift number=K.

Specifically, assuming that the pixel positions i of the pixel data constituting the first and second images are 0, 1, 2, . . . , r−1 from the left side and GR(i), GL(i)-denote the pixel data in the respective pixel positions (i) of the first and second images, respectively, the level differences are first calculated:

$$\Delta D(0)=|GL(0)-GR(0)|, \Delta D(1)=|GL(1)-GR(1)|, \ldots \Delta D(r-1)= |GL(r-1)-GR(r-1)|,$$

and the correctional value F(0) is calculated: F(0)=$\Delta D(0)+\Delta D(1)+ \ldots +\Delta D(r-1)$) by adding these level differences.

Subsequently, the second image is shifted by shifting the calculation area PL(1) of the second sensing portion by one pixel to the right, and the level differences $\Delta D(i)$ between the pixel data GR(i) and GL(i) and the correlational value F(1) are calculated in the same manner as above for a new pair of first and second images. Specifically, the level differences are calculated:

$$\Delta D(0)=|GL(1)-GR(0)|, \Delta D(1)=|GL(2)-GR(1)|, \ldots$$

$$\Delta D(r-1)=GL(r)-GR(r-1)|,$$

and the correctional value F(1) is calculated by adding $\Delta D(0)$, $\Delta D(1), \ldots, \Delta D(r-1)$.

The correctional values F(K) for the respective shift number K are successively calculated until the shift number K becomes equal to NS while alternately shifting the calculation areas PR(1), PL(1) of the first and second sensing portions in specified directions by one pixel.

As described above, in each pair of distance meter areas AR(i), the distance meter data is calculated by comparing the first and second images shifted from each other by a specified distance which are obtained by shifting the calculation areas PR(i) and PL(i) to the right and to the left (i.e., in directions in which the first and second images are spaced more away from a center position M between them). Accordingly, the shift areas QR(1) to QR(3) of the first image and the shift areas QL(1) to QL(3) of the second image are provided in the respective distance meter areas AR(1) to AR(3) of the first and second sensing portions, respectively.

In the camera 1, not all of the shift areas (QR(1), QL(1)) to (QR(3), QL(3)) provided in the respective pairs of distance meter areas AR(1) to AR(3) for the calculation of the distance meter data have the same size. Specifically, as shown in FIG. 5, the shift area (QR(3), QL(3)) of the pair of distance meter areas AR(3) in which displacements of the field of view in the AF frame 92 of the viewfinder optical system with respect to those in the respective pairs of distance meter areas AR(1) to AR(3) of the distance meter 5 are at minimum at a short distance (i.e., the spatial parallaxes of the pairs of distance meter areas AR(1) to AR(3) with respect to the AF frame 92 in the viewfinder are at minimum) are larger than the shift areas (QR(1), QL(1)) (QR(2), QL(2)) of the other pairs of distance meter areas AR(1), AR(2). In other words, assuming that the pixel numbers of the shift areas (QR(1), QL(1)) to (QR(3), QL(3)) are m1, m2, m3, respectively, m1=m2<m3.

The size of the shift area (QR(3), QL(3)) of the pair of distance meter areas AR(3) is set larger than that of the shift areas (QR(1), QL(1)), (QR(2), QL(2)) of the pairs of distance meter areas AR(1), AR(2) in order to make the measurable closest object distance even shorter without making the sensing area 91 of the AF sensor 10 larger than the conventional metering device.

Specifically, as described above, if the pair of distance meter areas AR(3) is included at least within the AF frame 92, the object distance can be calculated using the distance meter data of this pair of distance meter areas AR(3). Further, if the object comes to a position at the measurable closest distance, only the pair of distance meter areas AR(3) is included within the AF frame 92 due to the parallax between the AF frame 92 and the AF sensor 10. Accordingly, by setting the size of the shift areas (QR(1), QL(1)), (QR(2), QL(2)) of the pairs of distance meter area AR(1), AR(2) as large as that of the conventional AF sensor and setting only the size of the shift area (QR(3), QL(3)) of the pair of distance meter areas AR(3) larger than that of the conventional AF sensor, the measurable closest object distance can be shortened without making the size of the sensing area 91 of the AF sensor 10 larger than that of the conventional AF sensor as shown in FIG. 7.

Figure 7:
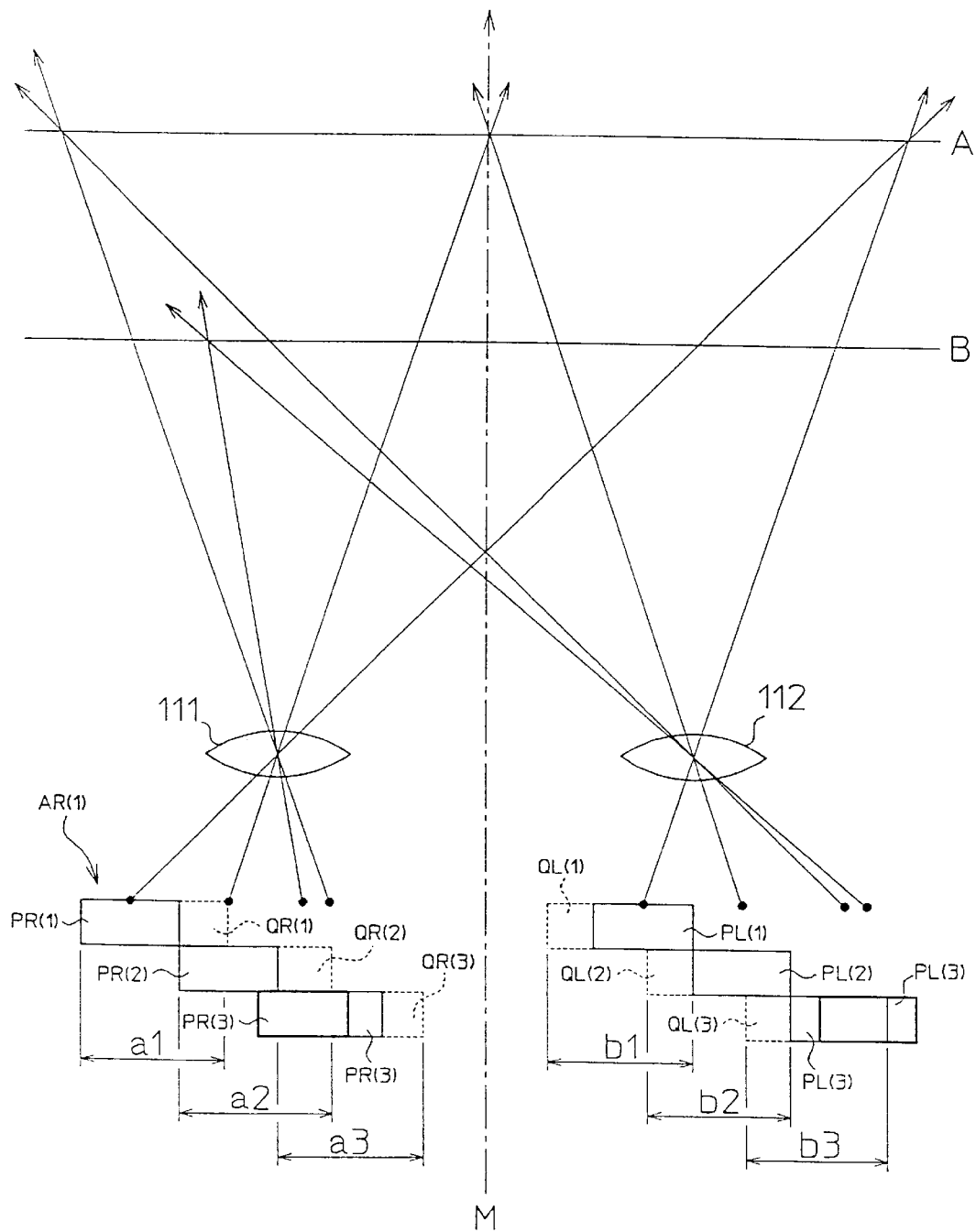
FIG. 7 is a diagram showing a position of an object in a measurable closest distance of each pair of distance meter areas.

FIG. 7 shows the respective measurable closest distances of the respective pairs of distance meter areas AR(1) to AR(3). The line A represents a position of the object at the measurable closest distance when the sizes m1, m2, m3 of the shift areas of the pairs of distance meter areas AR(1) to AR(3) are the same. The line B represents a position of the object at the measurable closest distance when the size m3 of the shift area of the pair of distance meter areas AR(3) is larger than those of the shift areas of the other pairs of distance meter areas AR(1), AR(2): m3>m1=m2. Further, a1 to a3 are distance meter ranges of the respective pairs of distance meter areas AR(1) to AR(3) of the first sensing portion when the sizes m1, m2, m3 of the shift areas of the pairs of distance meter areas AR(1) to AR(3) are the same, whereas b1 to b3 are distance meter ranges of the respective pairs of distance meter areas AR(1) to AR(3) of the second sensing portion when the sizes m1, m2, m3 of the shift areas of the pairs of distance meter areas AR(1) to AR(3) are the same.

As shown in FIG. 7, the position of the object at the measurable closest distance of the pairs of distance meter areas AR(1) to AR(3) can be detected when the calculation areas PR(1) to PR(3) of the first image and those PL(1) to PL(3) of the second image are in a maximum shift position of the distance meter ranges a1 to a3 and b1 to b3 (i.e., position farthest from the center position M of the first and second sensing portions). If the size m3 of the shift area of the pair of distance meter areas AR(3) is set such that m3>m1=m2, the shift areas QR(3), QL(3) of the pair of distance meter areas AR(3) are enlarged and the maximum shift position of the calculation areas PR(3), PL(3) shifts in a direction away from the center position M (i.e., a distance between the calculation areas PR(3) and PL(3) becomes longer) as shown by the bold line. Thus, the optical axis of the distance meter area AR(3) of the first sensing portion and that of the distance meter area AR(3) of the second sensing portion shift toward the center position M, thereby shortening the measurable closest object position from the line A to the line B.

In the case that the size of the shift areas (QR(1), QL(1)), (QR(2), QL(2)) of the pairs of distance meter areas AR(1), AR(2) are set equal to that of the conventional AF sensor and the size of only the shift area (QR(3), QL(3)) of the pair of distance meter area AR(3) is set larger than that of the conventional AF sensor, the measurable closest distance can be shortened without changing the size of the sensing area 91 of the AF sensor 10. However, a slightly longer calculation time is required because the images are shifted an increased number of times for the calculation of the distance meter data of the pair of distance meter area AR(3).

In order to avoid this disadvantage, the shift areas (QR(1), QL(1)), (QR(2), QL(2)) of the pairs of distance meter areas AR(1), AR(2) may be made smaller as much as the shift area (QR(3), QL(3)) of the pair of distance meter area AR(3) is made larger, so that the entire shift number for the calculation of the distance meter data of the pairs of distance meter areas AR(1) to AR(3) does not change. With this arrangement, the first and second sensing portions are shortened along their lengths by making the shift areas (QR(1), QL(1)), (QR(2), QL(2)) smaller. This advantageously leads to a shortened length of the AF sensor 10.

Figure 8:
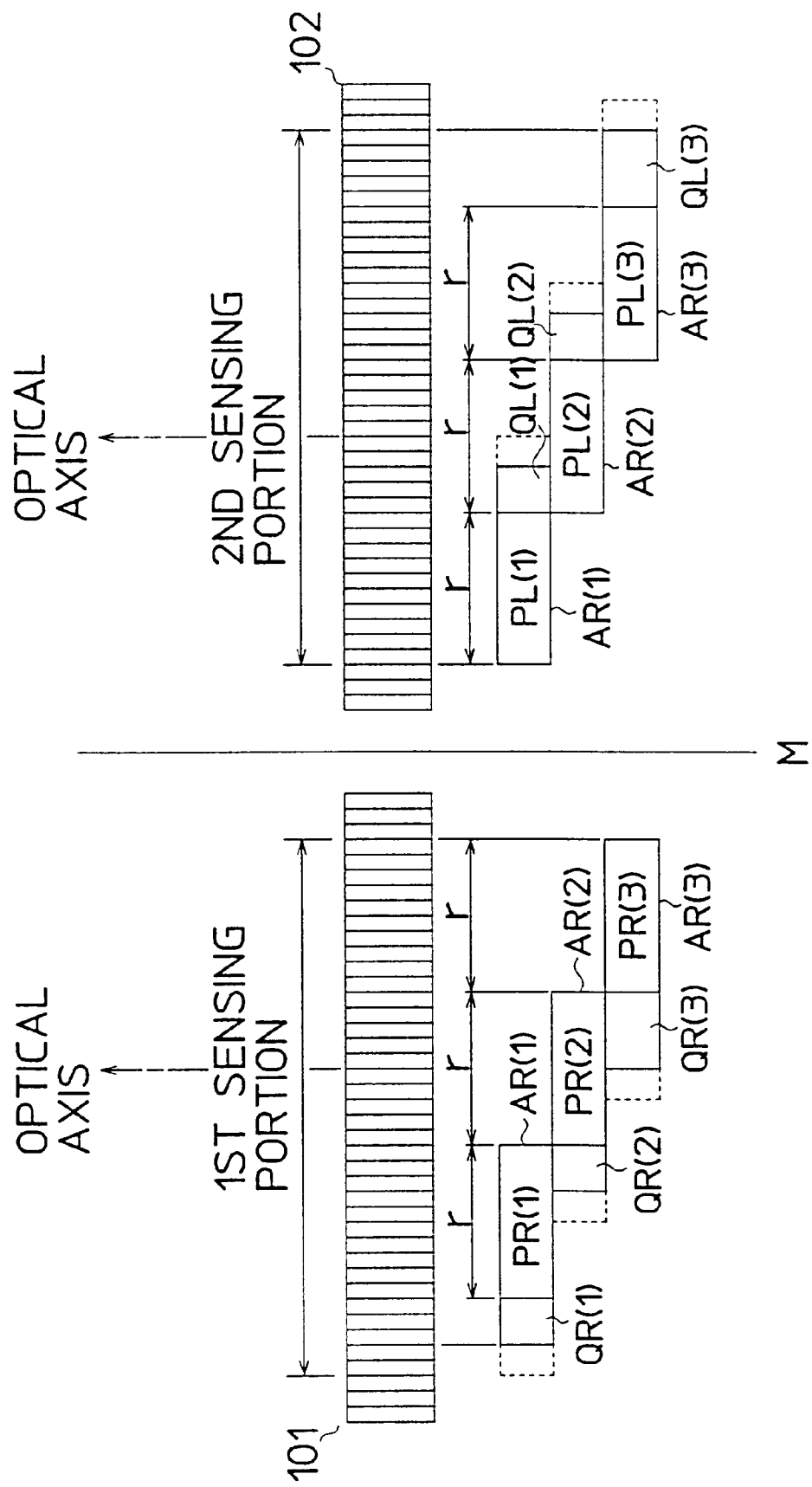
FIG. 8 is a diagram showing another arrangement of a plurality of distance meter areas provided in the first and second image sensing portions of the AF sensor.

On the other hand, as shown in FIG. 8, the size m3 of the shift areas Q3 of the pair of distance meter areas AR(3) may also be set such that m3>m1=m2 by setting the size of the shift areas (QR(1), QL(1)), (QR(2), QL(2)) of the pairs of distance meter areas AR(1), AR(2) smaller than that of the conventional AF sensor (size indicated by the dotted line in FIG. 8) while setting the size of the shift area (QR(3), QL(3)) of the pair of distance meter area AR(3) as large as that of the conventional AF sensor. However, in this case, since the shift area (QR(3), QL(3)) of the pair of distance meter area AR(3) has the same size as the conventional AF sensor, the measurable closest distance cannot be shortened.

Figure 9:
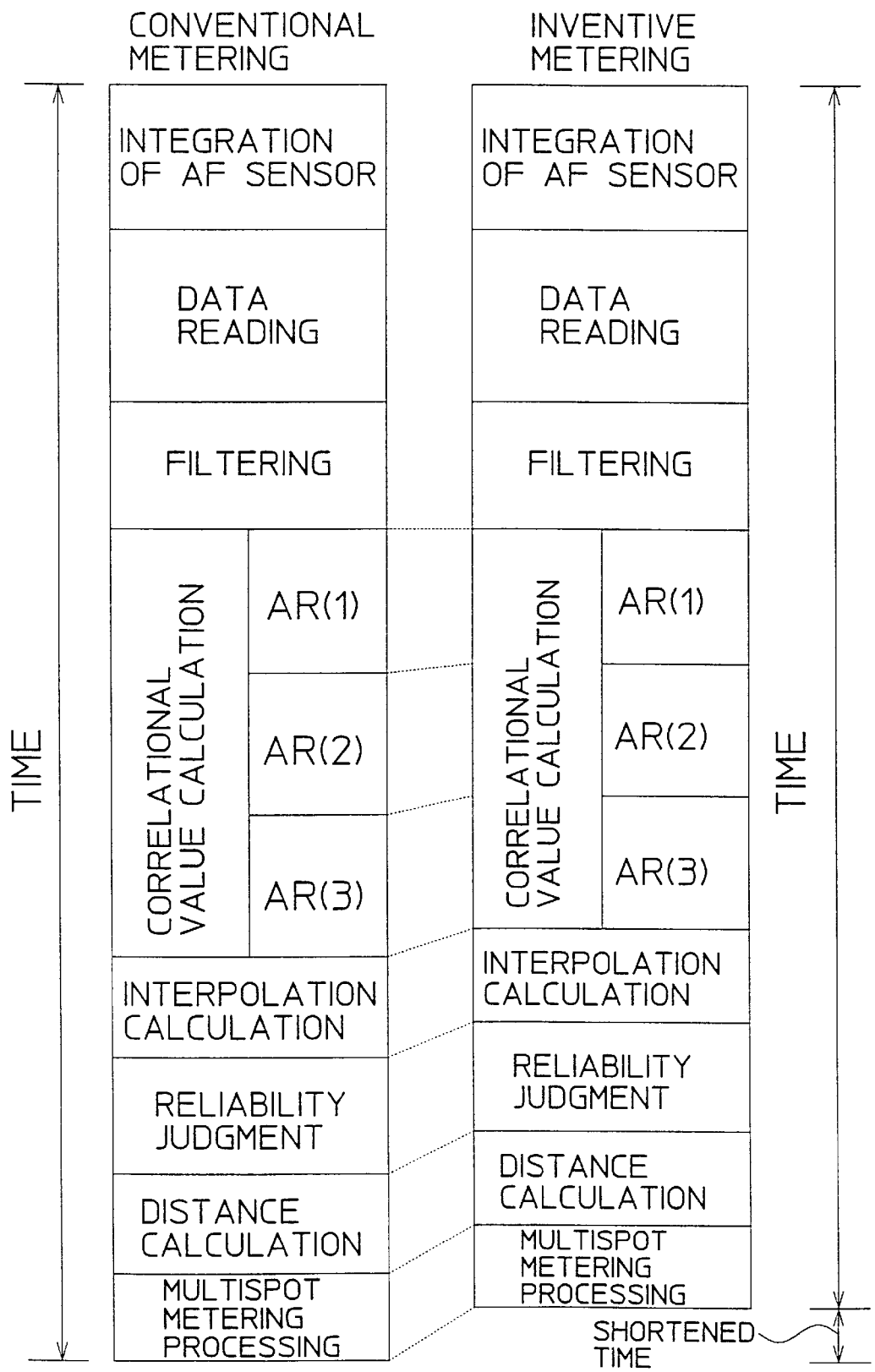
FIG. 9 is a diagram showing a shortening effect in metering time.

Nevertheless, since the size of the shift areas (QR(1), QL(1)), (QR(2), QL(2)) of the pairs of distance meter areas AR(1), AR(2) is set smaller than that of the conventional AF sensor in this case, the length of the AF sensor 10 can be advantageously shortened as described above. Further, as shown in FIG. 9, the time for calculating the distance meter data for the respective pairs of distance meter areas AR(1), AR(2) can be shortened because the images are shifted a reduced number of times for the calculation of distance meter data of the pairs of distance meter areas AR(1), AR(2). As a result, this case is effective in reducing the entire metering time in multi-spot metering.

Referring back to FIG. 4, the distance calculator 133 calculates distance meter data using the pixel data of the first and second images for each of the pairs of distance meter areas AR(1) to AR(3) according to the aforementioned multi-spot metering method, and further calculates distance meter data for the AF control using these data.

Figure 10:
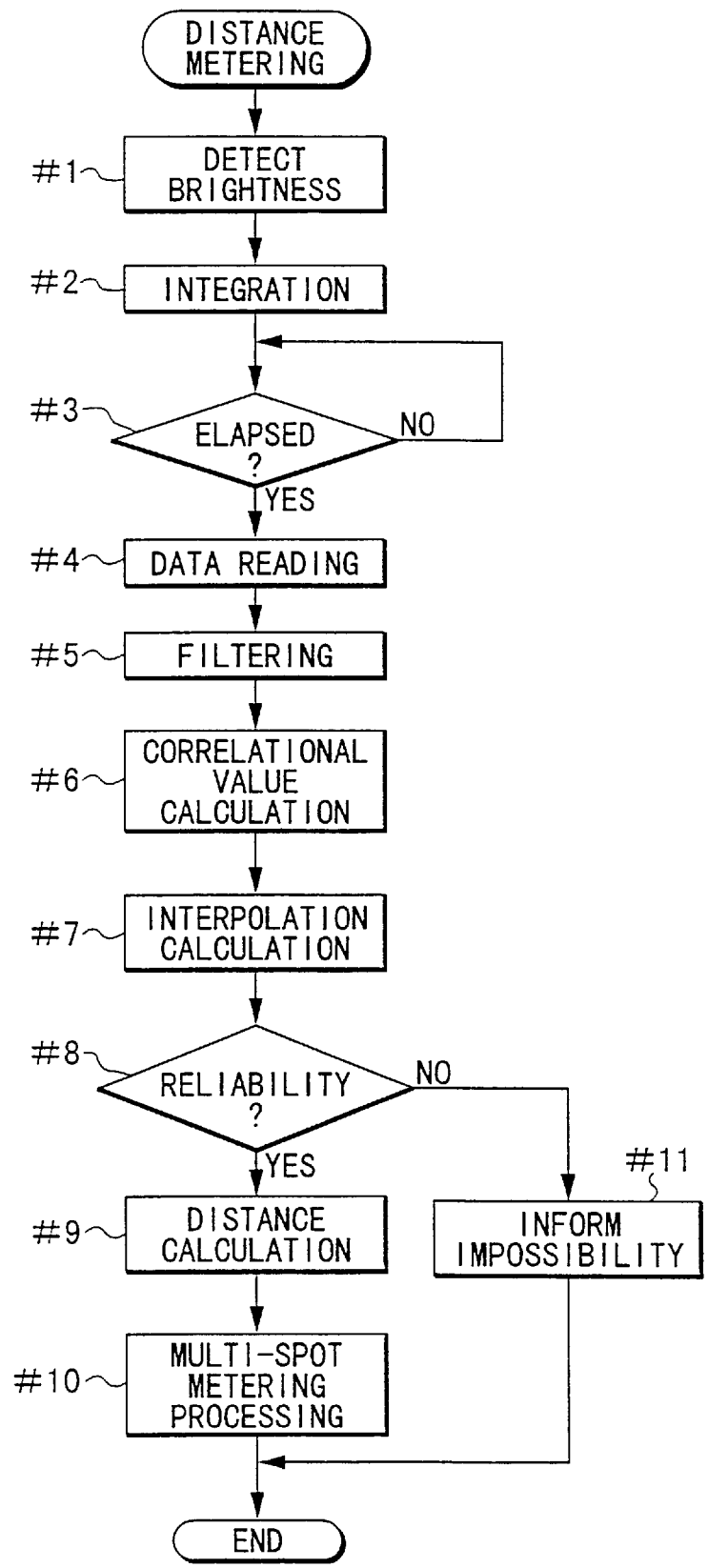
FIG. 10 is a flowchart showing a distance metering operation of the distance metering device.

Next, the distance metering of the distance metering device will be described with reference to a flowchart of FIG. 10.

First, an object brightness is detected by the light meter 4 (Step #1). Subsequently, the integration (light receiving operation) of the line image sensors 101, 102 is started (Step #2). A maximum integration time T of the line image sensors 101, 102 is set in advance based on a permissible distance metering time as a part of the photographing preparation. An actual integration time T of the line image sensors 101, 102 varies depending on an amount of incident light. When the light reception amount reaches a predetermined value (signal level necessary for the distance metering) within the maximum integration time, the integration ends at this moment.

Figure 11:
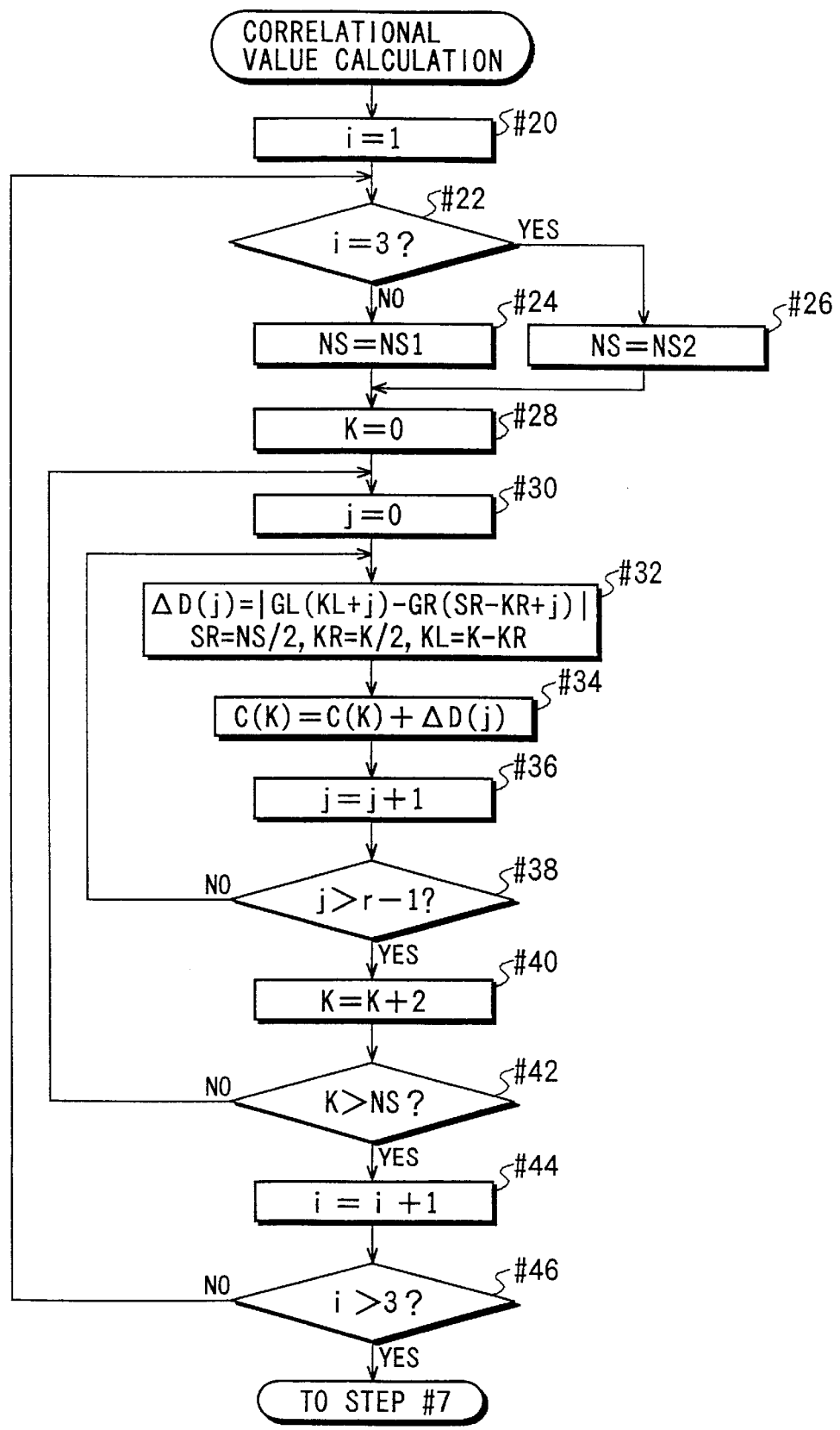
FIG. 11 is a flowchart showing a subroutine "Correlational Value Calculation"

After the elapse of the predetermined integration time T (YES in Step #3), the reading of pixel data stored in the line image sensors 101, 102 is started (Step #4). After filtering including a difference conversion and a gravity center conversion is applied to the read pixel data (Step #5), a correlational value calculation is performed in accordance with a subroutine "Correlational Value Calculation" shown in FIG. 11 (Step #10).

The difference conversion is such as to convert the read pixel data into difference data of pixel data spaced apart therefrom by, for example, several pixels. Specifically, if $G(k)(k=1, 2, \ldots, n)$ denotes the k-th pixel data and q denotes the number of discrete pixels, the pixel data $G(k)$ is converted into a difference data $\Delta g(k)=G(k)-G(k+q)$ by the filtering.

The gravity center conversion is such as to convert the position of the difference data $\Delta g(k)$. Specifically, the position of the difference data $\Delta g(k)$ is converted into data representing, for example, the pixel position $(k+q)/2$. This filtering is performed to reduce the detection error caused by a sensitivity difference between the line image sensors 101, 102.

Upon entering the subroutine "Correlational Value Calculation", a value of a counter i for counting a distance meter area number is set to "1" and the calculation of the correlational value F(K) for the distance area AR(1) is started (Step #20). Subsequently, it is discriminated whether the distance meter area number is "3" (Step #22). The shift number NS is set at NS1 (Step #24) if the distance meter area number is set at "3" (NO in Step #22), whereas it is set at NS2 (>NS1) (Step #26) unless otherwise (YES in Step #22).

Subsequently, a value of a counter K for counting the present shift number and a value of a counter j for counting the pixel position are set at "0", respectively (Steps #26, #28). The correlational value F(0) of the first and second images at the shift number K=0 is calculated in accordance with Equations (1), (2) by a loop of Steps #32 to #38.

$$F(I)=\Delta D(0)+\Delta D(1)+ \ldots +\Delta D(r-1) \quad (1)$$

where $$\Delta D(j)=|GL(KL+j)-GR(SR-KR+j)| \quad (2)$$

$SR=NS/2=m$ (rounded down integer)

$KR=K/2=s$ (rounded down integer)

$KL=K-KR=K-s$.

Equation (2) is an operational expression for calculating the level difference $\Delta D(j)$ between the pixel data $GR(j)$ of the first image and the pixel data $GL(j)$ of the second image in the pixel position j, and Equation (1) is an operational expression for calculating a sum of the level differences $\Delta D(j)$ in all pixel positions j.

Figure 12A:
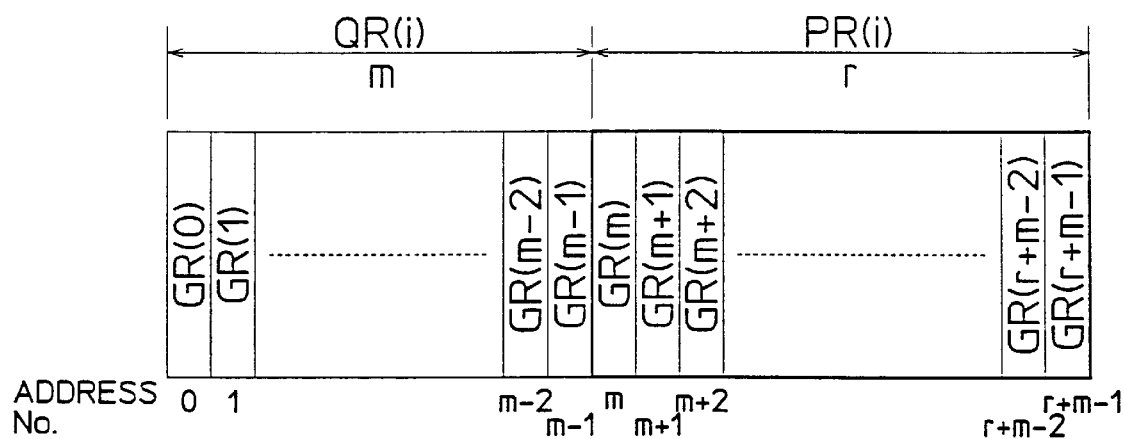
FIGS. 12A and 12B are diagrams showing address numbers affixed to pixel data included in the distance meter area of the first and second image sensing portions, respectively.
Figure 12B:
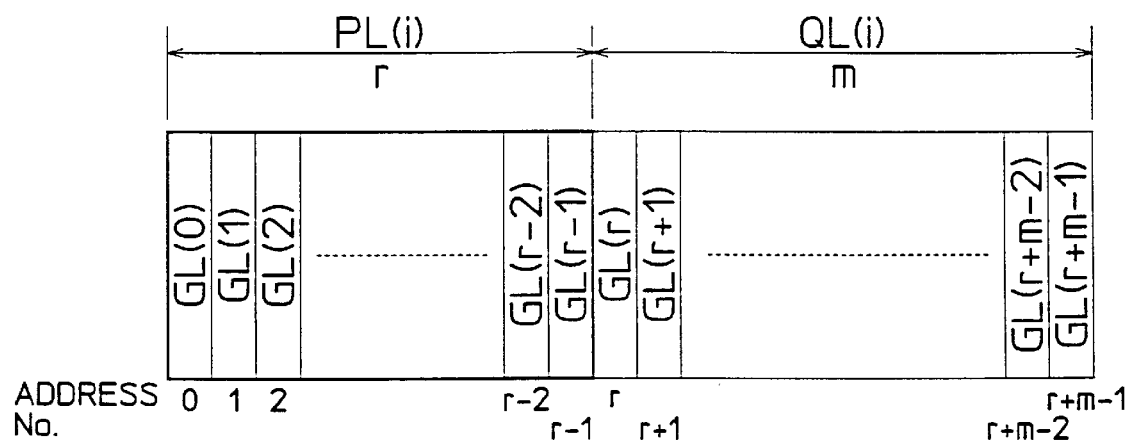
Figure 13:
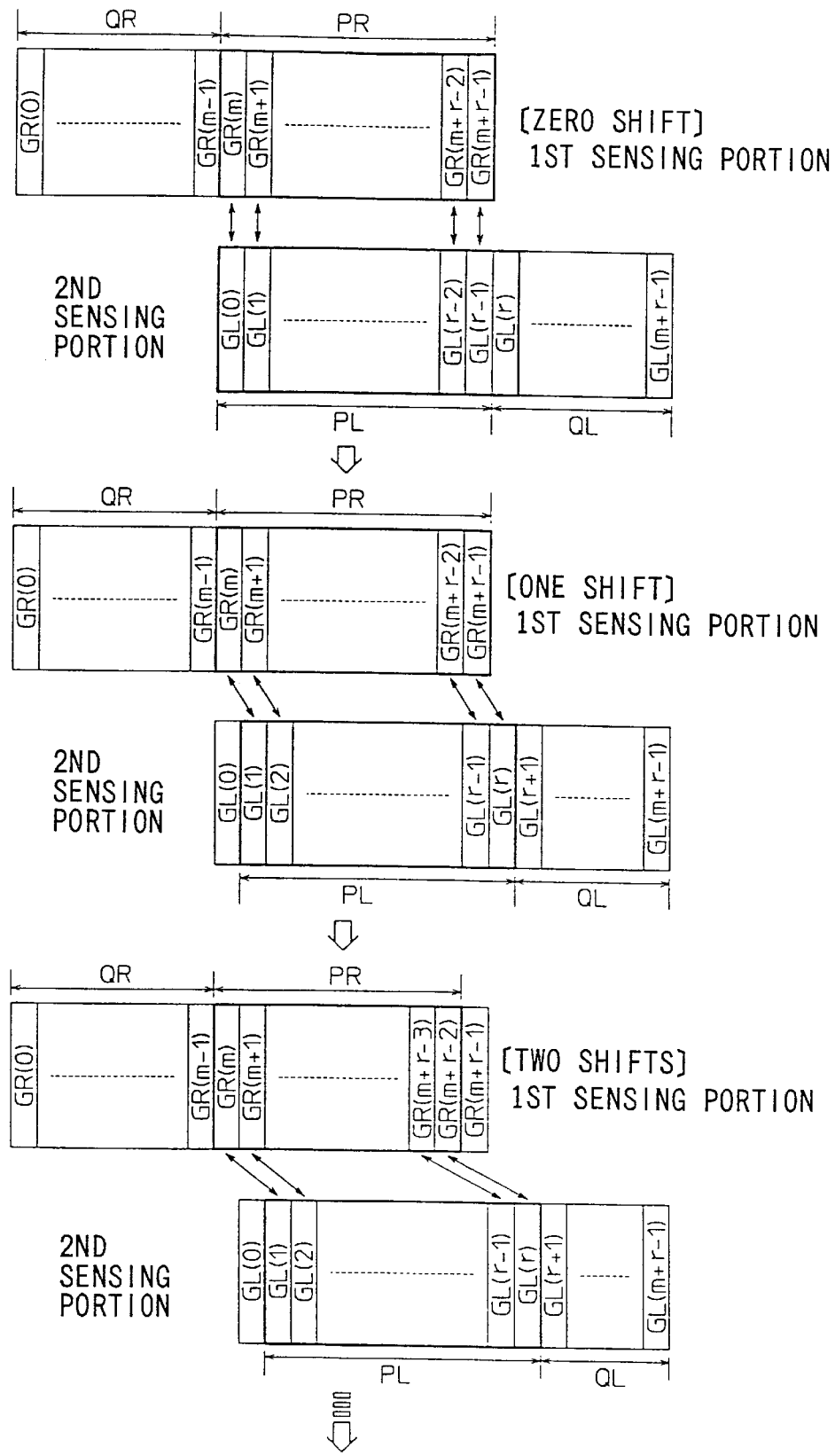
FIG. 13 is a diagram showing a manner of alternately shifting first and second images by one pixel and calculating a correlational value for each shift.
Figure 14:
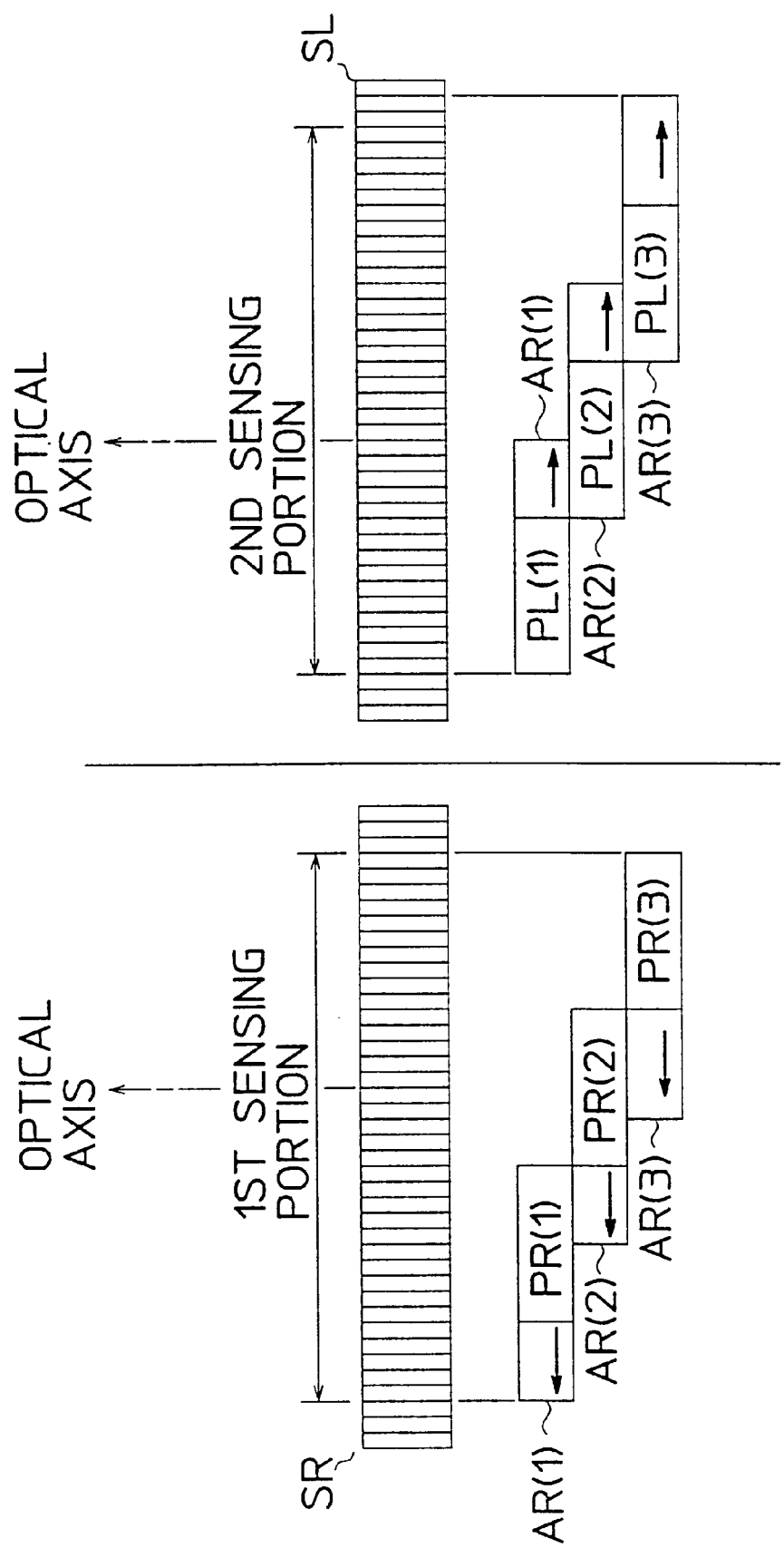
FIG. 14 is a diagram showing a multi-spot metering method adopted in a distance metering device of external light passive system.
Figure 15:
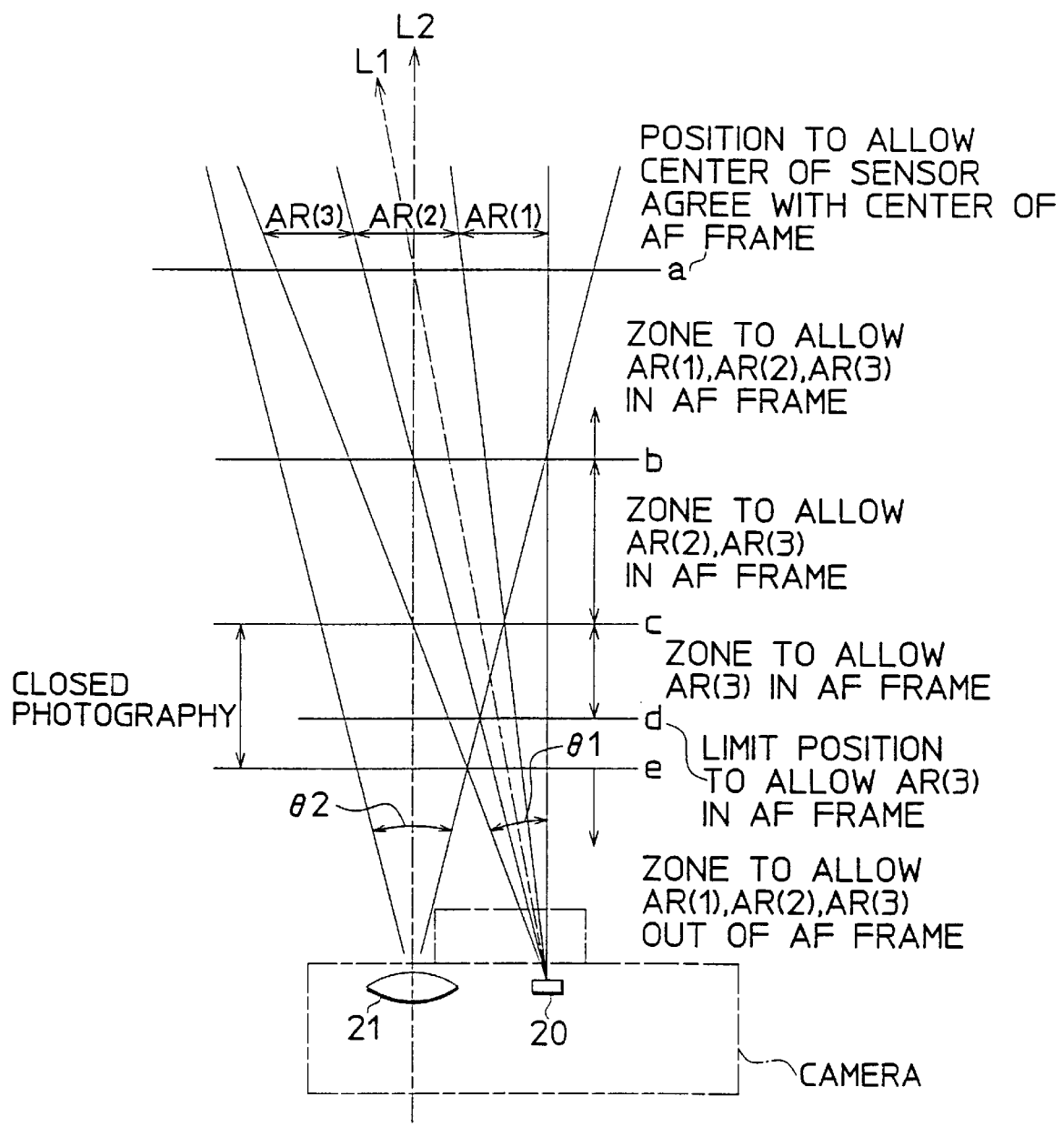
FIG. 15 is a diagram showing a relationship between a displacement of an AF frame provided in a viewfinder and a sensing area of a distance metering sensor due to a spatial parallax and an object distance.
Figure 16:
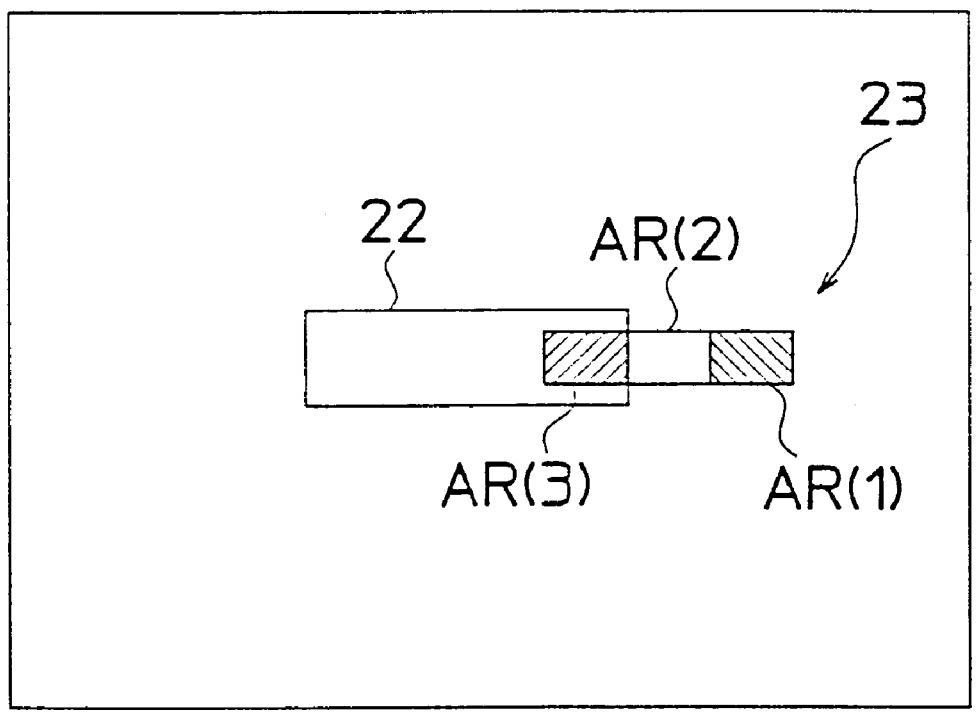
FIG. 16 is a diagram showing a relationship between a displacement of the AF frame provided in the viewfinder and the sensing area of the distance metering sensor.

In the correlational value calculation, numbers representing the pixel positions are affixed to the pixel data included in the respective pairs of distance meter areas AR(1) to AR(3) of the first and second sensing portions from the left end of each area as shown in FIGS. 12A and 12B. Specifically, assuming that r, m denote the number of pixels included in each of the calculation areas PR(i), PL(i) of the respective pairs of distance meter areas AR(i)(i=1, 2, 3) and the number of pixels included in each of the shift areas QR(i), QL(i) of the respective pairs of distance meter areas AR(i), a total pixel number Ni of the pairs of distance meter areas AR(i) is (m+r). Accordingly, 0, 1, 2, . . . , (m+r–1) are affixed to the respective pixel data of the first and second sensing portions from the left end.

On the other hand, the correlational value F(I) is calculated by alternately shifting the calculation area PR(i) from the right end of the first sensing portion toward the left end thereof by one pixel and the calculation area PL(i) from the left end of the second sensing portion toward the right end thereof by one pixel. Thus, the pixel number m included in each of the shift areas QR(i), QL(i) becomes NS/2 (rounded down).

Accordingly, when the shift number K=0, the numbers of the respective pixel data of the calculation area PR(i) are m(=NS/2), m+1, . . . , m+r–1 from the left end as shown in FIG. 12A, whereas the numbers of the respective pixel data of the calculation area PL(i) are 0, 1, . . . , r–1 from the left end as shown in FIG. 12B. At an arbitrary shift number K, the calculation area PR(i) is in a position shifted in a direction in which the numbers of the pixel data are decreased from the initial numbers by K/2=s (rounded down integer) pixels, whereas the calculation area PL(i) is in a position shifted in a direction in which the numbers of the pixel data are increased from the initial numbers by (K–s) (rounded down integer) pixels. Therefore, the number of the j-th pixel position from the left end of the calculation area PR(i) is (NS/2–s+j) and the number of the j-th pixel position from the left end of the calculation area PL(i) is (K–s+j).

In Equation (2), GL(KL+j) denotes pixel data in position (K–s+j) within the calculation area PL(i) at the arbitrary shift number K, and GR(SR–KR+j) denotes pixel data in position (NS/2–s+j) within the calculation area PR(i) at the arbitrary shift number K.

Referring back to FIG. 11, when the calculation of correlational value F(0) of the first and second images at the shift number K=0 is completed (YES in Step #38), the value of the counter K is incremented by 1 (Step #40) and it is judged whether this value exceeds the shift number NS (Step #42). If K≦NS (NO in Step #42), this routine returns to Step #30 to calculate the correctional value F(1) of the first and second images at the shift number K=1 by performing substantially the same operations as above.

Hereafter, the correlational values F(2), F(3) . . . of the first and second images at the shift number K=2, 3, . . . are calculated in the similar manner (loop of Steps #30 to #42). Upon the completion of the calculation of the correlational value F(NS) of the first and second images at the shift number K=NS (YES in Step #42), the value of the counter i is incremented by 1 (Step #44) and it is judged whether this value exceeds 3 (Step #46).

If i≦3(NO in Step #46), this routine returns to Step #22 to calculate the correctional values F(0) to F(NS) for the pairs of distance meter areas AR(2), AR(3). Upon the completion of the calculation of the correlational values F(0) to F(NS) for the pair of distance meter area AR(3) (YES in Step #46), the correlational value calculation is completed, exiting this subroutine.

Referring back to FIG. 10, an interpolation calculation is performed using the results of the correlational value calculation (Step #7). This interpolation calculation is performed to enhance the accuracy of the results of the correlational value calculation. Specifically, in the correlational value calculation, the correlational values F(0) to F(NS) representing the degree of coincidence of the two images are calculated while the first and second images are shifted with respect to each other by one pixel. Accordingly, if the shift amount bringing the highest degree of coincidence is located between the r-th pixel and the (r+1)th pixel, there is an error between an accurate displacement of the first and second images and a displacement calculated based on the minimum correlational value. The interpolation calculation is performed to calculate a displacement $Y_M$ of the first and second images having a reduced error by interpolating a presumed correlational value F between the pixel position having the minimum correlational value F(r) and the pixel positions around it.

Subsequently, the reliability of the correlational value calculated for each of the pairs of distance meter areas AR(1) to AR(3) is judged (Step #8). This judgment is made based on the level of the object brightness as well as contrast values C(i) calculated for each pair of distance meter area AR(i). The contrast value C(i) is calculated, for example, as a sum of level differences of neighboring pixels within the pair of distance meter area AR(i), i.e., represents a degree of contrast of the image within the pair of distance meter areas AR(i). The smaller the contrast value C(i), the less the density of the image varies and, accordingly, the position of the second image where it coincides with the first image becomes unclear. Thus, the reliability of the correlational values F of this pair of distance meter areas AR(i) is low. Therefore, if the contrast value C(i) is determined to be smaller than a predetermined threshold value by comparing the two values, it is judged to be unreliable. Instead of the contrast values C(i), the reliability judgment may be made using a ratio $Y_M/C(i)$ of the displacement $Y_M$ obtained by the interpolation calculation to the contrast value C(i).

If the result of the correlational value calculation is judged to be "reliable" in any of the pairs of distance meter areas AR(i) (YES in Step #8), the object distance is calculated using the displacement $Y_M$ of the first and second images for this pair of distance meter areas AR(i) (Step #9). In other words, a defocus amount of the taking lens 3 is calculated from the displacement $Y_M$, and the object distance is calculated by applying a specified calculation to this defocus amount.

The distance metering ends after a multi-spot metering processing is performed (Step #10). The multi-spot metering processing is performed to calculate a final object distance data for the AF control using the object distance data of a suitable one of the pairs of distance meter areas AR(i) having the correlational value F judged to be reliable. Specifically, this calculation is performed by extracting the shortest object distance data from the pair of distance meter areas AR(i) having the correlational value judged to be reliable or by averaging the object distance data of a plurality of pairs of distance meter areas AR(i).

Further, as described above, when the object is at a short distance or close position, only the pair of distance meter areas AR(3) is included within the AF frame 92 and, accordingly, there is a likelihood that the result of the distance metering has a reduced reliability because the pairs of distance meter areas AR(1), AR(2) are not used for the calculation. Thus, whether or not the object is within a specified short distance from the camera 1 may be judged, for example, by comparing the object distances in the pair of distance meter areas AR(i) having the correlational values judged to be reliable with a specified threshold value. If the object is within the specified short distance from the camera 1, the object distance data for the AF control is calculated based on the preferentially selected object distance data of the pair of distance meter areas AR(3).

On the other hand, if the correlational values F of all the pairs of distance meter areas AR(1) to AR(3) are judged to be "unreliable" (NO in Step #8), the distance metering ends after an impossibility to conduct the distance metering is informed to the photographer by, for example, displaying a warning (Step #11).

In the above multi-spot metering processing, the pair of distance meter areas AR(3) is automatically preferentially used to calculate the object distance data for the AF control when the object distance is short. However, the camera 1 may be provided with a selection button for selecting the pair of distance meter areas AR(3) so that, when photographing an object at a short distance, the photographer can operate this selection button to select the pair of distance meter areas AR(3). In such a case, if the distance metering is performed only for the pair of distance meter areas AR(3), the time required therefor can be shortened.

As described above, in the distance metering device which adopts a multi-spot metering method of external light passive type, a relative shift number in the calculation of a correlational value for a pair of distance meter area having a smallest spatial parallax with respect to a distance meter frame among a plurality of pair of distance meter areas provided in a pair of image sensors is set larger than that for the other pairs of distance meter areas. For example, by setting the shift number of the other pairs of distance meter areas equal to that of the conventional distance metering device and increasing the shift number for the pair of distance meter area having a smallest spatial parallax with respect to the distance meter frame, the measurable closest distance of this distance meter area can be more shortened than in the case where the shift number is not increased. As a result, the measurable closest distance can be reduced as compared with the conventional distance metering device.

Further, by setting the shift number of the pair of distance meter areas having a smallest spatial parallax with respect to the distance meter frame equal to that of the conventional distance metering device and increasing the shift number of the other pairs of distance meter areas, the time required for calculation of a correlational value for these distance meter areas can be shortened. As a result, the time required for the multi-spot metering can be more shortened than in the conventional distance metering device.

Furthermore, if an object is judged to be within a specified short distance based on the object distance information calculated in the respective distance meter areas, the object distance information for focusing is calculated using the object distance information of the pair of distance meter area having a smallest spatial parallax. Accordingly, there is no likelihood that the reliability of the result of the distance metering decreases due to the object distance information from the distance meter areas outside the AF frame.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A distance metering device comprising:
   a pair of first image sensor and second image sensor, each image sensor including a number of pixels arranged along a specified direction;

a pair of first optical member and second optical member which introduce light from an object to the first and second image sensors, respectively, the first and second optical members having an optical axis different from an optical axis of an optical system of a viewfinder for providing a view of the object;

a distance data calculator which defines a plurality of pairs of meter areas over pixels of the first and second image sensors respectively, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for a particular pair of meter areas which have a smallest spatial parallax with respect to the optical axis of the optical system of the viewfinder different from that for the other pairs of meter areas.

2. A distance metering device according to claim 1, wherein the shift number setter sets a larger shift pixel number for the particular pair of meter areas than that for the other pairs of meter areas.

3. A distance metering device according to claim 1, wherein the distance data calculator includes:
a first distance data calculation portion which calculates preliminary distance data based on image data from each pair of meter areas; and
a second distance data calculation portion which calculates final distance data based on the preliminary distance data calculated by the first distance data calculation portion.

4. A distance metering device according to claim 3, wherein the second distance data calculation portion adopts preliminary distance data based on image data from the particular meter area as final distance data when at least one preliminary distance data is below a predetermined value.

5. A distance metering device according to claim 3, wherein the distance data calculator further includes a reliability judgment portion which judges whether each preliminary distance data is reliable; and the second distance data calculation portion calculates final distance data based on preliminary distance data judged to be reliable by the reliability judgment portion.

6. A distance metering device according to claim 5, wherein the reliability judgment judges the reliability of each preliminary distance data based on a contrast of image data of the meter area.

7. A distance metering device comprising:
a pair of first image sensor and second image sensor, each image sensor including a number of pixels arranged along a specified direction;
a pair of first optical member and second optical member which introduce light from an object to the first and second image sensors, respectively, the first and second optical members having an optical axis different from an optical axis of an optical system of a viewfinder for providing a view of the object;

a distance data calculator which defines a plurality of pairs of meter areas over pixels of the first and second image sensors respectively, the plurality of pairs of meter areas including a particular pair of meter areas for metering a close object, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for the particular pair of meter areas different from that for the other pairs of meter areas.

8. A distance metering device according to claim 7, wherein the shift number setter sets a larger shift pixel number for the particular pair of meter areas than that of the other pairs of meter areas.

9. A distance metering device according to claim 8, wherein the particular pair of meter areas have a smallest spatial parallax with respect to the optical axis of the optical system of the viewfinder among the plurality of pairs of meter areas.

10. A distance metering device according to claim 7, wherein the particular pair of meter areas have a smallest spatial parallax with respect to the optical axis of the optical system of the viewfinder among the plurality of pairs of meter areas.

11. A distance metering device according to claim 7, wherein the viewfinder is provided with a frame mark indicative of a metered section of the object, and at least the particular pair of meter areas meters the metered section of the object when metering a close object.

12. A distance metering device according to claim 7, wherein the distance data calculator adopts distance data based on image data from the particular meter area as final data concerning a distance to the object when distance data based on image data from at least one pair of meter areas is below a predetermined value.

13. An optical apparatus comprising:
a viewfinder which includes an optical system having an optical axis and provides a view of an object;
a pair of first image sensor and second image sensor, each image sensor including a number of pixels arranged along a specified direction;
a pair of first optical member and second optical member which introduce light from an object to the first and second image sensors, respectively, the first and second optical members having an optical axis different from the optical axis of the optical system of the viewfinder;
a distance data calculator which defines a plurality of pairs of meter areas over pixels of the first and second image sensors respectively, the plurality of pairs of meter areas including a particular pair of meter areas for metering a close object, each meter area including a specified number of pixels, and calculates distance data concerning a distance to the object by performing a plurality of comparisons between image data from a meter area of the first image sensor and image data from the corresponding meter area of the second image sensor, the plurality of comparisons being performed by shifting a pair of corresponding meter areas of the first and second image sensors relative to each other a set number of pixels; and a shift pixel number setter which sets a shift pixel number for each pair of corresponding meter areas, the shift number setter setting a shift pixel number for the particular pair of meter areas different from that for the other pairs of meter areas.

14. An optical apparatus according to claim 13, wherein the shift number setter sets a larger shift pixel number for the particular pair of meter areas than that for the other pairs of meter areas.

15. An optical apparatus according to claim 13, wherein the particular pair of meter areas have a smallest spatial parallax with respect to the optical axis of the optical system of the viewfinder among the plurality of pairs of meter areas.

16. An optical apparatus according to claim 13, wherein the viewfinder is provided with a frame mark indicative of a metered section of the object, and at least the particular pair of meter areas meters the metered section of the object when metering a close object.

17. An optical apparatus according to claim 13, the optical apparatus being a camera.

18. An optical apparatus according to claim 13, wherein the distance data calculator adopts distance data based on image data from the particular meter area as final data concerning a distance to the object when distance data based on image data from at least one pair of meter areas is below a predetermined value.

* * * * *